(12) United States Patent  (10) Patent No.: US 9,367,951 B1
Gray et al.  (45) Date of Patent: Jun. 14, 2016

(54) CREATING REALISTIC THREE-DIMENSIONAL EFFECTS

(75) Inventors: Timothy T. Gray, Seattle, WA (US); David Allen Smith, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 595 days.

(21) Appl. No.: 13/425,810

(22) Filed: Mar. 21, 2012

(51) Int. Cl.
*G06T 15/20* (2011.01)

(52) U.S. Cl.
CPC ..................... *G06T 15/20* (2013.01)

(58) Field of Classification Search
None
See application file for complete search history.

(56) References Cited

U.S. PATENT DOCUMENTS

| | | | |
|---|---|---|---|
| 2010/0201790 A1* | 8/2010 | Son et al. | 348/53 |
| 2011/0248987 A1* | 10/2011 | Mitchell | 345/419 |
| 2012/0154599 A1* | 6/2012 | Huang | H04N 5/232 348/169 |
| 2012/0300046 A1* | 11/2012 | Blayvas | 348/54 |
| 2012/0314899 A1* | 12/2012 | Cohen et al. | 382/103 |
| 2013/0044124 A1* | 2/2013 | Reichert, Jr. | 345/618 |
| 2013/0135196 A1* | 5/2013 | Park | G06F 3/01 345/156 |

* cited by examiner

*Primary Examiner* — Kevin McInnish
(74) *Attorney, Agent, or Firm* — Polsinelli LLP

(57) ABSTRACT

Graphical elements displayed on a two-dimensional display screen have an appearance that is consistent with a three-dimensional view of those elements over a range of viewing angles. A current viewing angle of a user is determined, and a view of an element to be rendered can be determined that includes an orientation appropriate for the current viewing angle. An image manipulation process is applied in order to enable the element to have the determined view from the current viewing angle of the user, taking into account the angle of the display screen with respect to the user. In at least some embodiments, an anamorphic skewing process can be used to correlate locations on the display screen with apparent positions of those locations at the current viewing angle, and cause the graphical elements to be rendered on the display screen with a skew or distortion based on the correlated locations.

27 Claims, 8 Drawing Sheets

CREATING REALISTIC THREE-DIMENSIONAL EFFECTS

BACKGROUND

People are increasingly utilizing electronic devices to perform a wide variety of tasks. In order to help users to navigate and perform these tasks in more intuitive and user-friendly ways, interfaces are increasingly providing new views and types of interactivity. One such approach involves using an interface that replicates a three-dimensional experience on a two-dimensional screen. A three-dimensional processing or rendering engine is used to generate a view of an object with an orientation that appears to be consistent with a three-dimensional view of that object. While such approaches can provide realistic three-dimensional effects when viewed from directly in front of the display screen, the realistic effect is reduced and eventually lost as the viewer moves increasingly off-axis.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to rendering graphical objects and other content on an electronic display device. In particular, various approaches discussed herein enable three-dimensional views to be rendered on a two-dimensional display element of an electronic device that are consistent across at least a range of viewing angles so as to provide a realistic three-dimensional experience. Various embodiments determine a viewing angle and/or relative position of a user with respect to a computing device. In at least some embodiments, a computing device can determine a relative position of the head, eyes, or other such feature or aspect of a user. By determining this relative position, the device can determine the approximate viewing angle of the user. Based at least in part upon the viewing angle or relative location, software executing on (or in communication with) the device can determine an appropriate rendering view for one or more objects to be displayed. Further, the software (and/or hardware) can determine an amount of distortion or skewing, such as may be based upon an anamorphic rendering approach, to be performed in order to enable the object to have the determined rendering view from the current viewing angle. In at least some embodiments, a desired rendering view is produced by a three-dimensional rendering engine, and an anamorphic processing algorithm is used to manipulate the information for the rendering view in order to render an image with the actual shape and size of the display element that will provide the desired rendering view from the current viewing angle.

Various other applications, processes, and uses are presented below with respect to the various embodiments.

Figure 1:
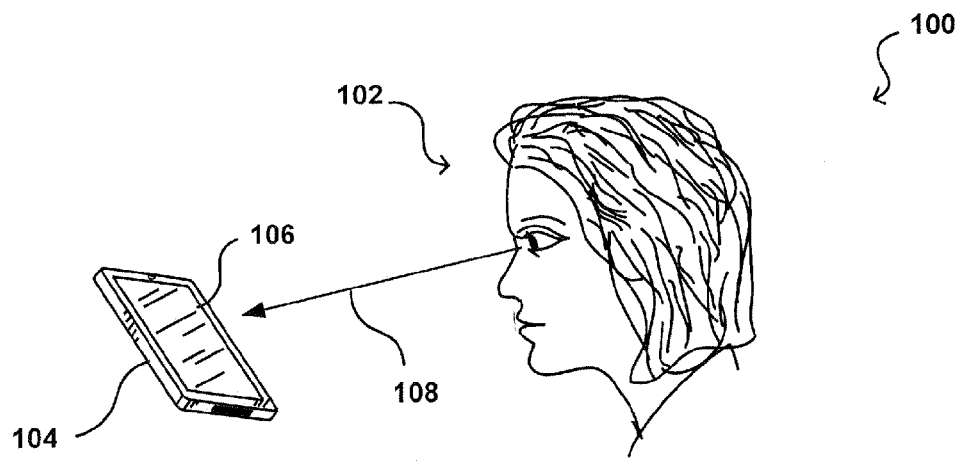
FIG. 1 illustrates an example of a user viewing content displayed on a computing device in accordance with at least one embodiment.

FIG. 1 illustrates an example situation 100 wherein a user 102 is viewing content displayed on a display screen 106 of a computing device 104. Although a portable computing device (e.g., a smart phone, an e-book reader, or tablet computer) is shown, it should be understood that various other types of electronic device that are capable of determining and processing input can be used in accordance with various embodiments discussed herein. These devices can include, for example, notebook computers, personal data assistants, televisions, video gaming consoles or controllers, and portable media players, among others. As illustrated, users often are not positioned directly in front of the screen and/or do not orient themselves such that a primary plane of the display screen of such a device is orthogonal to the viewing direction 108 of the user. This can be a result of the user moving with respect to the device, the user viewing the device from an off-axis location (such as where the user is sitting in a chair looking at a tablet on a table top), and/or the user tilting or otherwise adjusting a position of the device for any of a number of reasons. For example, certain interfaces can enable a view of an object to be adjusted based on a relative viewing angle of the user with respect to the device.

Figures 2A, 2B:
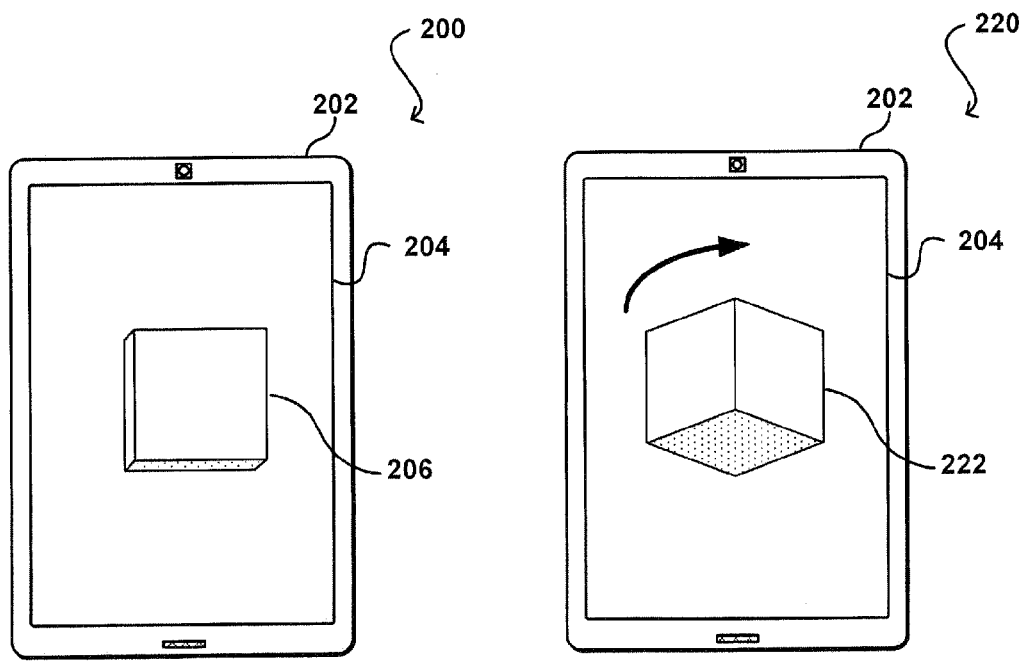
FIGS. 2(a) and 2(b) illustrate an example rendering of an object to simulate a three-dimensional view that can be utilized in accordance with various embodiments.

There are many existing rendering engines that are able to analyze information for a graphical object and render that object such that it appears to be three-dimensional in nature. For example, FIG. 2(a) illustrates an example view 200 of a box 206 rendered on a display screen 204 of a computing device 202. Although the display screen is two-dimensional in this example, the box 206 can have effects such as lighting and shading applied that appear to give it a three-dimensional appearance. Further, the box can be associated with data, such as a three-dimensional model or depth information, that can enable different views of the object to be rendered to enhance the three-dimensional experience. For example, the box 206 illustrated in FIG. 2(a) might be rendered by taking a three-dimensional model or frame of a box, determining an orientation with which to render the box, and creating a view of the box by processing the three-dimensional model for the determined orientation. The process can also involve texture mapping, shading, and other such processes to generate a two-dimensional rendering of the box that mimics a three-dimensional rendering of the box. The process can update such that the appearance of the box changes with changes in the determined orientation. For example, in the view 220 of FIG. 2(b) a different rendering 222 of the box is displayed. This rendering corresponds to a rotation of the box, such as may be due to the user providing input to adjust the orientation of the box. Based on the different orientation, the rendering engine and/or other such process(es) can determine the appropriate orientation to enable the box to appear like a three-dimensional object that has an appearance that is consistent with that of an actual three-dimensional object during rotations or other such movements.

Figure 3A:
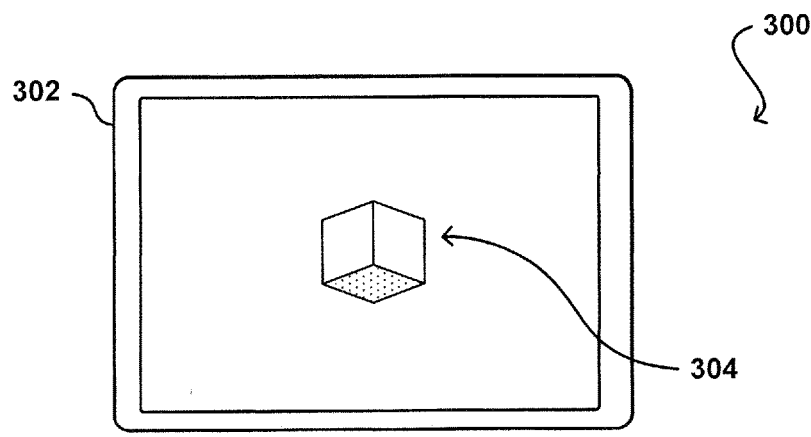
FIGS. 3(a), 3(b), and 3(c) illustrate example views of an object rendering that can be provided in accordance with various embodiments.
Figure 3B:
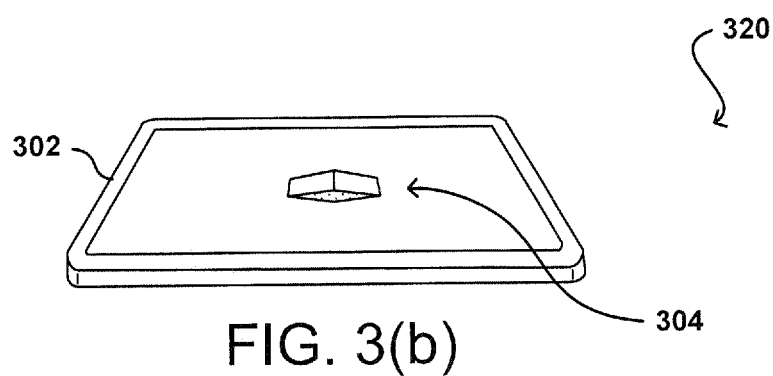

As mentioned above, however, the realism of such a rendering relies upon the user being positioned along a viewing direction that is substantially orthogonal to a primary plane of the display screen. As an example, FIG. 3(a) illustrates a state 300 of a computing device 302 wherein an object 304 is rendered on the computing device with a particular orientation. As long as the user is positioned substantially in front of the display, the three-dimensional appearance seems realistic. In various embodiments discussed herein, a user might cause the view of such an object to change by changing the viewing angle of the user with respect to the device. The rotation of the object in FIG. 3(a) thus could be due to the user tilting the device in order to obtain this view of the object. As illustrated in the state 320 of FIG. 3(b), however, it can be seen that the appearance of the object 302 when viewed at an oblique angle with respect to the device is no longer consistent with a square box. Even though the rendering of the box might be appropriate for the viewing angle, the fact that the display screen is also at an angle with respect to the user causes the view of the object to be distorted. As illustrated in FIG. 3(b), for example, the display screen no longer appears as a rectangle from the point of view of the user, but appears as a trapezoid. This leads to the result that objects adjacent to the far edge of the display will generally appear compressed with respect to objects adjacent to the near edge of the display. Further, the apparent height of the display screen (from the point of view of the user) decreases with an increase in the relative viewing angle with respect to normal, with the height approaching zero as the primary plane of the display element becomes parallel to the viewing direction of the user.

Figure 3C:
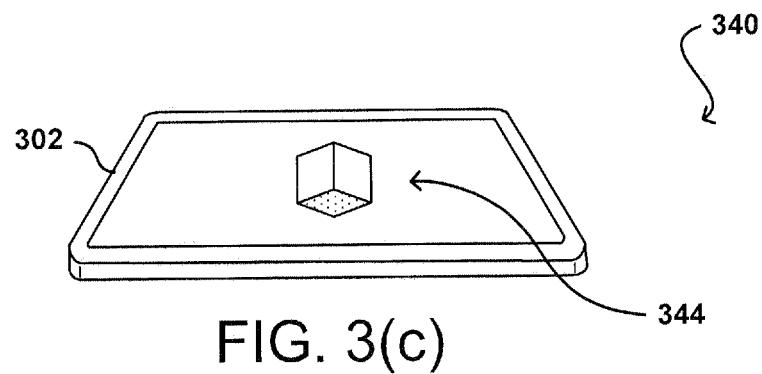

In many cases, a desired outcome of a three-dimensional rendering process would be to have the object appear to be an actual object that is consistent in view across multiple viewing angles. For example, in the state 340 of FIG. 3(c) the box 344 is rendered to have an angle-appropriate orientation, as could be a result of a three-dimensional rendering engine, but the view of the box from the point of view of the user is not affected by the relative angle of the device. That is, the box still has the shape of an actual box in addition to having an appropriate orientation for that viewing angle.

Systems and methods in accordance with various embodiments can provide such functionality through the use of what is referred to herein as a "corner pinning" process. Such a process can be described with respect to the example situation 400 of FIG. 4(a). In this example, a grid is used to show how relevant portions of a display screen look at different viewing angles of a user. For example, a trapezoidal grid 402 is shown that represents the appearance of the display screen to the user when the primary plane of a display screen is at an oblique angle with respect to the eyes of the user. A square version of the grid 404 represents the appearance of the example display screen when the user is viewing the display screen from a direction substantially orthogonal to a primary plane of the screen. In order to have an object appear to be a realistic three-dimensional object in space, the object needs to have substantially the same shape for the same orientation regardless of whether the user is looking straight on or at an oblique angle. As illustrated, however, increasing the viewing angle leads to an increasing distortion of objects on the screen.

Approaches in accordance with various embodiments can determine the approximate shape and/or distorted view of the display screen from the point of view of the user based on the relative position and/or viewing direction of the user. For example, if the user is "straight on," the screen will appear as a square or rectangle (assuming a square or rectangular screen, respectively). As the user begins to tilt the device, for example, an apparent length of the far edge of the device begins to decrease from the point of view of the user. Similarly, the apparent height of the screen appears to decrease continuously with an increase in viewing angle. These factors result in the screen appearing to have a trapezoidal shape from the point of view of the user. Thus, using standard geometric equations and calculations, the apparent shape of the trapezoid can be determined for a current point of view of a user. In some cases, viewing distance can be determined as well to determine an approximate size of the display screen from the point of view of the user, in order to maintain a consistency of size of a rendered object over different viewing distances as well. Various other such determinations can be utilized as well within the scope of the various embodiments.

Figure 4A:
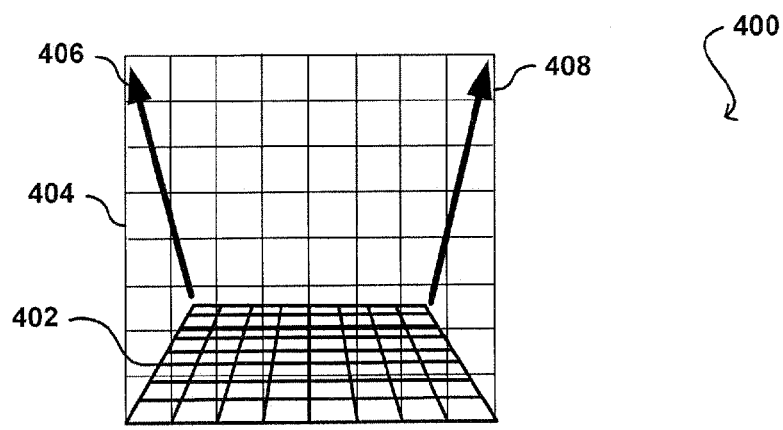
FIGS. 4(a), 4(b), 4(c), and 4(d) illustrate an example process for skewing an object to provide a realistic three-dimensional view in accordance with various embodiments.

Using such a process, a shape of a trapezoid 402 such as that illustrated in FIG. 4(a) can be determined. In order to provide a realistic rendering, however, the positions on the trapezoid have to be mapped or otherwise correlated with actual positions on the display screen, such as corresponds to the square grid 404. A "corner pinning" process provides such correlation, as the upper left hand corner of the trapezoid grid can be mapped to, and/or otherwise correlated with, the upper left hand corner of the square grid according to a first mapping vector 406. The upper right hand corner of the trapezoid grid can similarly be mapped to the upper right hand corner of the square grid according to a second mapping vector 408. As can be seen, the lower left and right hand corners of the two grids can remain substantially unchanged (assuming rotation about the lower edge and no change in distance, for example, although for at least some applications the unchanged edge can be utilized regardless of distance). Any position between the four corners will be mapped by a corresponding amount. For example, each grid crossing location of the trapezoidal grid 402 can be mapped to corresponding trapezoidal grid crossing of the square grid 404. In this way, a rendering engine can utilize the desired appearance of an object in the trapezoidal shape of the screen from the current viewing angle of the user, and determine where on the display screen each of the points of that object should actually be displayed to provide that view. It should be understood that while square and rectangular two-dimensional screens are shown for purposes of explanation, one or more display elements of any appropriate shape, size, configuration, and capabilities can be used as well within the scope of the various embodiments.

Figure 4B:
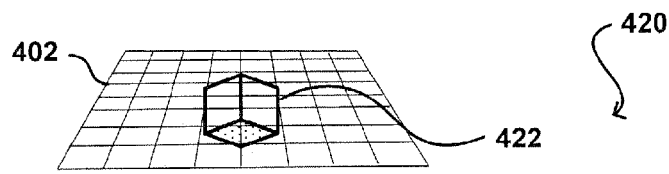
Figure 4C:
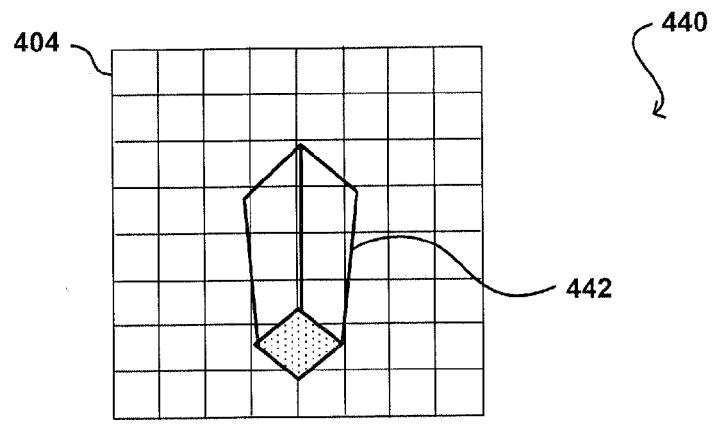
Figure 4D:
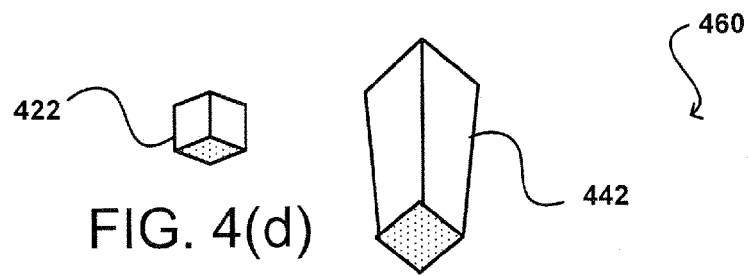

For example, FIG. 4(b) illustrates an example view 420 of a desired appearance of an object 422 from a current viewing position of the user, where the screen has a trapezoidal appearance 402 from the point of view of the user. In order to enable the object to have that appearance from that viewing position, a rendering engine or process determines not only the desired appearance and/or orientation, but also how to skew, distort, or otherwise manipulate the image information in order to provide that view from the current viewing angle. Using a corner pinning approach as discussed, a rendering process can perform a mapping or position correlation such that the process can determine the necessary shape of the object 442 to be displayed on the square screen shape 404, as is shown in the example view 440 of FIG. 4(c). As can be seen, the object 442 is elongated along the viewing direction of the user, in order to compensate for the compression in that direction with increased viewing angle. Similarly, the far edge of the object is expanded to account for the lateral compression (perpendicular to the viewing direction) as a result in increased angle. It can be seen that features of the objects correspond to similar points on both the square and trapezoidal grids. In order to provide a better view of the difference in renderings, the view 460 of FIG. 4(d) illustrates a desired appearance 422 of the object from the current point of view of the user, as well as the actual rendering 442 of the object to be provided to enable the user to obtain that appearance from the current point of view.

An alternative way to think about a corner pinning approach is to treat the pinning more like a ray tracing experiment. For example, a computing device can determine for the view of FIG. 4(b) where a ray from at least one of the user's eyes will intersect a portion of the element to be displayed. That ray can be extended to determine where that ray intersects the display screen at that angle. By using a ray tracing of the element to map corresponding regions of the display screen, the display state of FIG. 4(c) can be determined. Approaches for determining relative eye location, the shape of the screen from the user's viewpoint, and the desired image view can be determined as discussed elsewhere herein, and the rays can be generated by processing that information once determined.

Figure 5A:
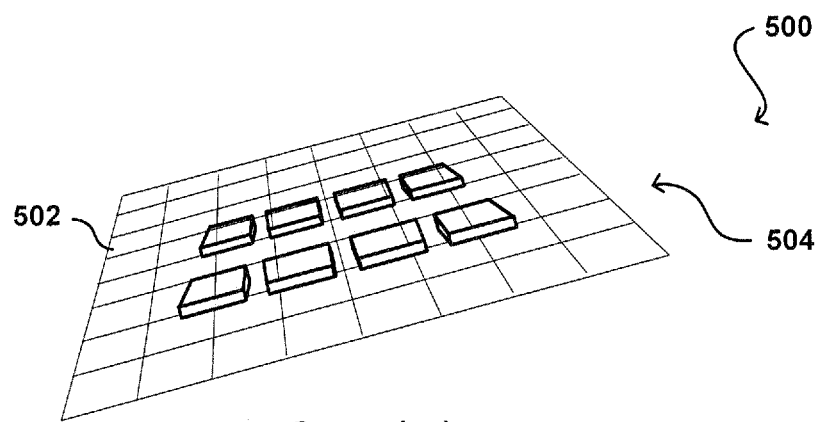
FIGS. 5(a) and 5(b) illustrate example views of a realistic three-dimensional rendering of a set of interface elements that can be provided in accordance with various embodiments.
Figure 5B:
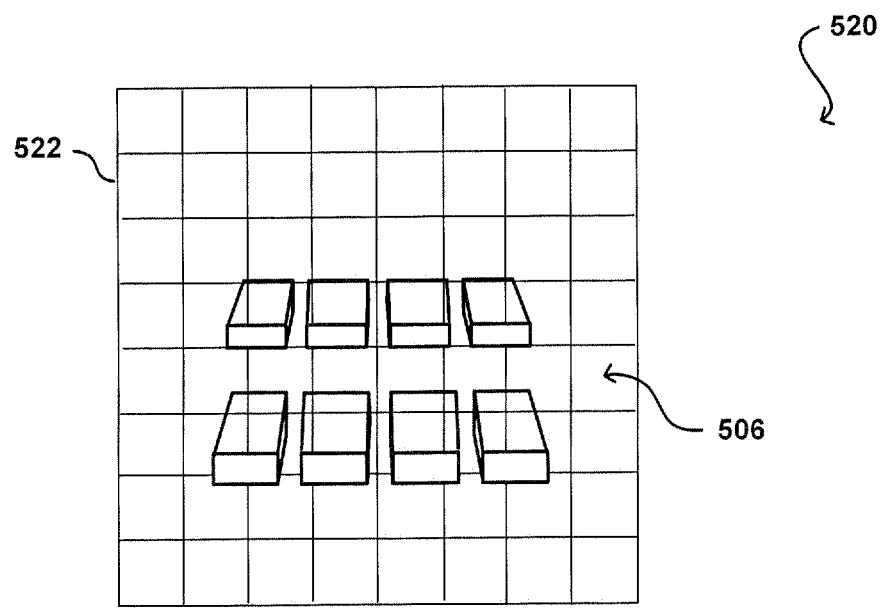

In many cases, the viewing angle will not be in a plane substantially orthogonal to a primary plane of the display screen, but can be determined in three dimensions. For example, FIG. 5(a) illustrates an example apparent shape 500 of a display screen 502 when, for example, a computing device is tilted in more than one direction with respect to a user. A similar corner pinning approach can be used, where points on the apparent shape of the display from the point of view of the user are mapped to the actual shape of the display, where the apparent shape is based upon the relative viewing angle. Similar compression effects will occur that can be compensated for in the pinning process, but the direction of the compensation can change with changes in viewing angle as should be understood from the geometry of the viewing angles.

In at least some embodiments, interpolation or a similar process can be performed in order to provide a more realistic appearance. For example, a display screen might be 720 pixels wide, but at an oblique angle might only appear to be 50 pixels wide. If the rendering engine generates an angle-appropriate rendering that is 50 pixels wide (or high, depending on the orientation) then the information for the 50 pixels may need to be stretched to fill the 720 pixel width. A direct mapping can lead to jagged edges or blocky appearance as known for significantly increasing the resolution of an image. Accordingly, the rendering engine can do an interpolation, ray tracing, model generation, or other such processes known for improving the appearance when increasing the number of pixels across which image information is to be displayed.

A corner pinning process in at least some embodiments can be based at least in part on the theory of anamorphosis. Anamorphosis, as known in the visual arts, is an approach that involves distorting an image such that a viewer has to be positioned at a certain vantage point in order to obtain a desired view of an image. A corner pinning process utilizes a similar approach, but instead of rendering an image that requires a user to be at a specific location or viewing angle in order to obtain the desired appearance, a corner pinning process determines the current viewing angle of the user and then manipulates the image information or data such that the image when displayed has the desired appearance from the current viewing angle. Further, a corner pinning process enables the image manipulation to be continually updated in order to maintain a realistic three-dimensional appearance even as the viewing angle changes.

One way to think about an example adjustment in image size is to view the grid as having the bottom edge along the x-axis in a Cartesian coordinate system, and having the grid rotate back in the z-direction with the bottom edge remaining on the x-axis. For an object touching x-axis at the bottom, the height of the object will decrease with an increasing angle θ, according to $$a = h^* \cos \theta,$$

where a is the apparent height of the object, h is the "actual" height of the object, and θ is the amount that the viewing angle varies from normal to the display screen. For an object with a height of 10 pixels, for example, the apparent height of the object would remain at 10 pixels when viewed with a viewing angle of 0 degrees with respect to normal, and would go to 0 pixels at a viewing angle of 90 degrees with respect to normal. Between those two viewing positions, the apparent height would change with cos θ. Accordingly, a reverse approach can be used to determine how much to stretch an object to get the necessary apparent height for the current viewing angle.

Such an approach may not have been particularly advantageous in many conventional devices, as it was assumed that the user would be viewing the display screen substantially "head on," or any off-axis viewing was ignored as it could not be tracked by the device. Devices that can be utilized in accordance with various embodiments utilize head tracking, feature location, or other such processes that enable these devices to determine a location and/or direction of the user relative to the device. This additional information enables the device to render images that not only have a three-dimensional appearance, but provide a three-dimensional appearance that is consistent and realistic for changing viewing angles of the user. Thus, a user can tilt the device, or move his or her head, in order to obtain different views of an object, where the appearance of the object remains consistent with an actual object and is not compressed as with conventional three-dimensional representations on a two-dimensional screen when viewed at an oblique angle.

As discussed, approaches in accordance with various embodiments can attempt to determine a current relative position of the user with respect to the device. In various embodiments, a computing device can track the viewing angle of the user over time in order to dynamically update the rendering as needed.

Figure 6A:
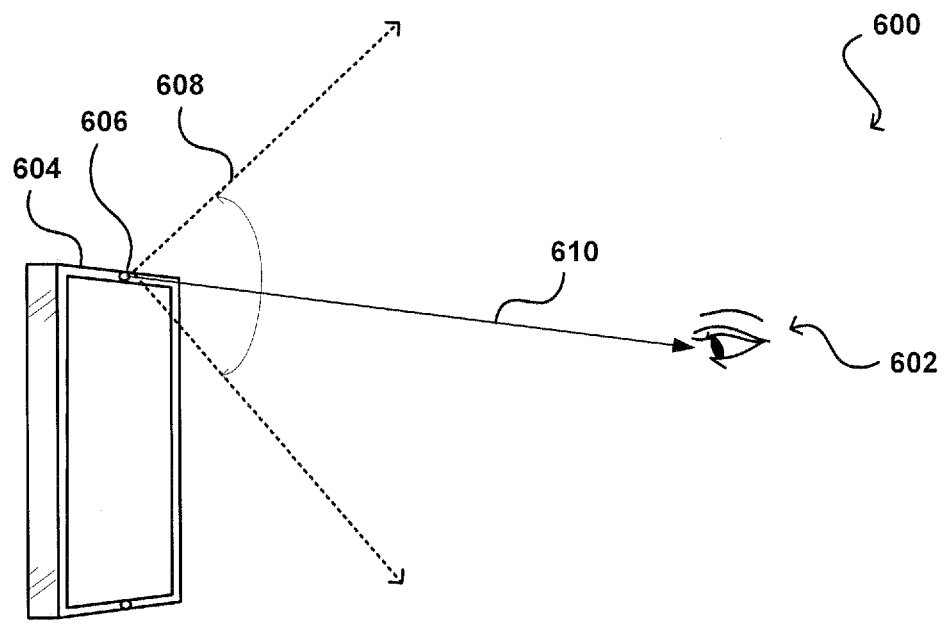
FIGS. 6(a) and 6(b) illustrate an example approach to determine the viewing angle of a user that can be utilized in accordance with various embodiments.
Figure 6B:
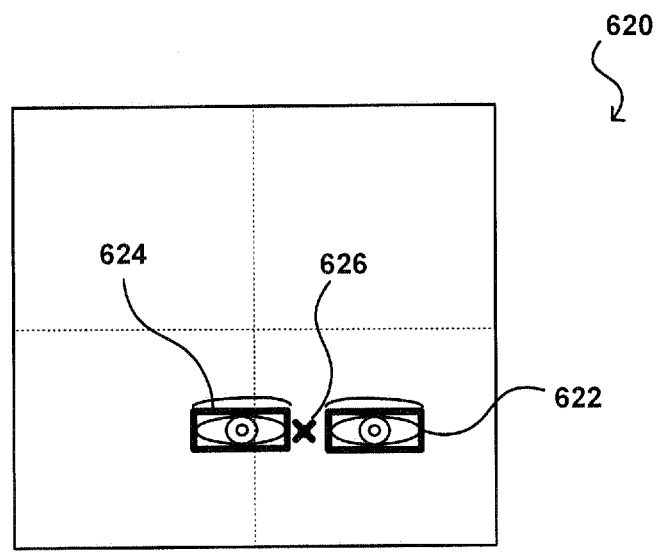

FIGS. 6(a) and 6(b) illustrate an example approach to determining the relative position and/or perspective of a user that can be used to adjust a rendering of content in accordance with various embodiments. In this example, one or more of the user's eyes 602 is detected in image information captured by a camera 606 of a computing device 604 when at least a portion of the user's head is within the field of view 608 of the camera. In many embodiments, where the device is looking for a viewing direction, a single camera can be sufficient to provide that direction. In other embodiments where more accurate corrections are desired, stereo imaging using two cameras, or another such approach that provides information in three dimensions (or otherwise including distance) can be used to determine the position of the user's eyes in three dimensions, which can help to determine more accurate image manipulations.

In some embodiments, the camera 606 can be a video capture element capable of capturing a substantially continuous stream of image information, at least over a specified period of time. Since it can be very resource intensive to process the entire video stream using facial detection algorithms or other such processes, various approaches can instead utilize a less robust algorithm, such as a pattern matching algorithm, to attempt to identify the presence of a person's head or other such feature in the image stream. For example, a pattern matching algorithm can look for a contour or shape that matches the shape of a human head within a specified level or range of certainty. Various other approaches to identifying a feature in an image, such may include feature detection, facial feature extraction, feature recognition, stereo vision sensing, character recognition, attribute estimation, or radial basis function (RBF) analysis approaches, are well known in the art and will not be discussed herein in detail. Upon detecting such a shape or contour, the device can track a relative position or area in the captured image information corresponding to the user's head. Approaches for detecting and tracking shapes or contours are known in the art and as such will not be discussed herein in detail. In at least some embodiments, the detection of a user's head can cause at least one perspective determining process to be activated, or can at least trigger a portion of a relative position determining process. In some embodiments, a computing device can have at least one infrared (IR) emitter and receiver, or at least one IR transceiver, operable to transmit IR radiation and detect IR reflected back from one or more objects within a field of view of the IR receiver. As known in the art, the human eye reflects IR radiation differently than the rest of the human head, such that the presence and/or position of a user's eyes can quickly be detected and/or located by analyzing a captured. IR image. Such information can help determine the presence of a user's head without requiring significant image processing, and can also help improve the perspective determinations in at least some embodiments.

In FIG. 6(b), a similar approach can be used to locate the user's eyes or another such feature. In this example 600, a recognition algorithm might first analyze the captured image 620 to locate a region including a user's head, to reduce the amount of image information that needs to be analyzed. On a reduce portion or an entire image, for example, a pattern recognition algorithm or other process (e.g., IR recognition) discussed or suggested above can be used to locate one or more eyes of the user in the image information. In addition to the algorithms discussed above, other approaches for locating an iris or pupil of a user, such as by monitoring infrared reflection, can be utilized as well within the scope of the various embodiments. Examples of such approaches can be found, for example, in co-pending U.S. patent application Ser. No. 12/332,049, entitled "Movement Recognition as Input Mechanism," filed Dec. 10, 2008, which is hereby incorporated herein by reference. In this example, a detection algorithm finds and tracks the regions 622, 624 of the user's eyes in the captured video information. Based at least in part upon these regions, the device can determine a point 626 between those regions that can correspond to the user head or eye "location" used to determine the gaze direction, point of view, or perspective of the user.

As illustrated in this example, both eyes of the user might be able to be located in the captured image information. Depending on factors such as the desired level of sensitivity and distance between the user and the device, however, such information can impact the accuracy of the input position determinations. For example, a vector from the user's right eye through the display element might intersect the touch sensitive surface at a substantially different location than a vector from the user's left eye, which can result in erroneous shift determinations. Approaches in accordance with various embodiments can take advantage of the fact that the human brain combines and processes information from both eyes such that the user views the device from a "single" point of view. Thus, the software can attempt to determine an intermediate point 626 between the user's eyes to use as the user's point of view. Various other approaches can be used as well, such as are discussed later herein.

To further improve accuracy, approaches in accordance with various embodiments can also account for the fact that humans typically have a dominant eye, such that the point of view for a given user typically will not be a center point between that user's eyes. For example, a person who is right eye dominant will have a point of view that is closer to that user's right eye. Further, right eye dominant users often have less offset than left eye dominant people. In some embodiments, an initial calibration procedure can be used to attempt to determine a user's point of view. In other embodiments, a center point of the user's eyes can be used as an initial approximation, and then small adjustments made by the user over time can be monitored to attempt to adjust the center point determination, such as where the user frequently drifts his or her finger slightly to the left to select the correct element. In at least some situations, this information can be stored and/or updated for each user, such that the accuracy can be improved even when multiple users utilize a single device. Various other calibration adjustments can be done in real time as well, as may be due to other variations between specific users.

Figure 7:
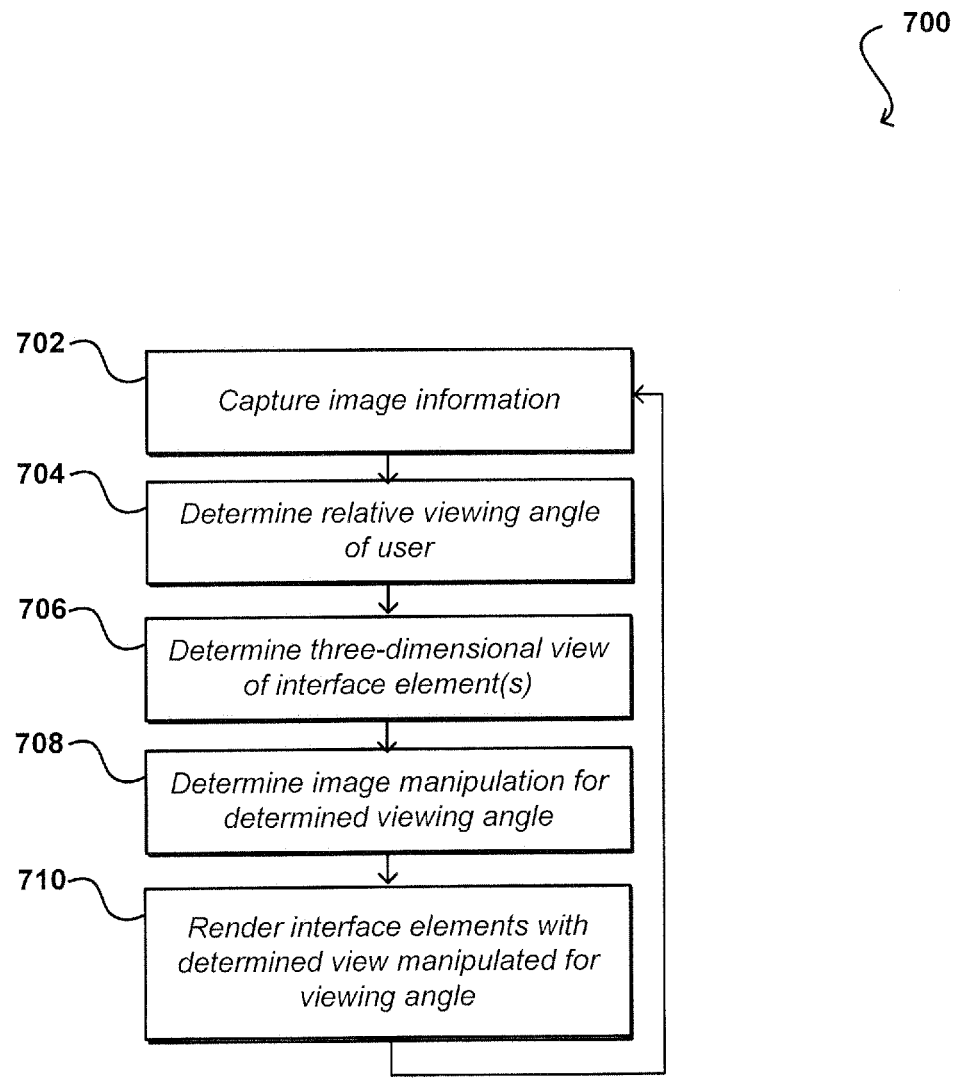
FIG. 7 illustrates an example process for rendering a realistic three-dimensional view of an object that can be utilized in accordance with various embodiments.

FIG. 7 illustrates an example process 700 for providing a viewing-angle dependent realistic object rendering that can be utilized in accordance with various embodiments. It should be understood that, for any process discussed herein, there can be additional, fewer, or alternative steps performed in similar or alternative orders, or in parallel, within the scope of the various embodiments unless otherwise stated. In this example, head (or feature) tracking is activated on a computing device. The tracking can be activated manually, by a user, or automatically in response to an application, activation, startup, or other such action. Further, the feature that the process tracks can be specified or adjusted by a user, provider, or other such entity, and can include any appropriate feature such as the eyes, nose, head, pupils, or other such feature. In at least some embodiments a determination can be made as to whether there is sufficient lighting for image capture and analysis, such as by using a light sensor or analyzing the intensity of captured image information. In at least some embodiments, a determination that the lighting is not sufficient can cause one or more types of illumination to be activated on the device. In at least some embodiments, this can include activating one or more white light LEDs positioned to illuminate a feature within the field of view of at least one camera attempting to capture image information. As discussed elsewhere herein, other types of illumination can be used as well, such as infrared (IR) radiation useful in separating a feature in the foreground from objects in the background of an image, or for quickly locating the pupils of a user, among other such aspects.

During the process, at least one camera can capture 702 image information as discussed elsewhere herein. The captured image information, which can be a series of still images or a stream of video information in various embodiments, can be analyzed to attempt to determine 704 the relative head position and/or viewing angle of the user with respect to the device. As discussed elsewhere herein, various image recognition, contour matching, color matching, retro-reflection, or other such approaches can be used to identify a feature of interest (e.g., head or eyes) from the captured image information. Once the current viewing angle of the user is determined, information for rendering a three-dimensional view for a determined orientation of at least one interface object can be determined 706, where the orientation of the object is appropriate for the determined viewing angle. For example, if a tile is to be rendered to appear to be a block attached to the screen of the display device, viewing the device from an angle would cause at least one side of the tile to be viewable in the rendering.

The current viewing angle can also be utilized, using the same three-dimensional rendering engine or a different module or process, for example, to determine 708 an amount of anamorphic skew or other such image manipulation to be applied to the image. As discussed elsewhere herein, one such process can determine the apparent shape, size, and/or orientation of the display screen from the point of view of the user, and can map points or portions of that apparent view to the corresponding points or portions of the actual display screen layout. In at least some embodiments, mapping information or functions may already be stored on, or available to, the device, such that mapping need not be done in real time. The mapping or transformation information can be used to adjust the image information as necessary to provide the desired anamorphic effect. A correlation function can also (or alternatively) be used in some embodiments that provides an amount of manipulation needed for an input viewing angle. Other such approaches can be used as well as would be apparent to one of ordinary skill in the art in light of the teachings and suggestions contained herein. Once the three-dimensional view and anamorphic manipulation information are determined and/or applied to the image information, the interface elements can be rendered 710 using the determined view and manipulated such that the interface elements have a realistic three-dimensional appearance from the point of view of the user. As discussed, the process can continue such that changes in the viewing angle of the user can be determined and the rendering updated to have both the proper object orientation and image distortion.

In some embodiments ambient-light imaging can be with a digital camera (still or video) to capture images for analysis. In at least some instances, however, ambient light images can include information for a number of different objects and thus can be very processor and time intensive to analyze. For example, an image analysis algorithm might have to differentiate the head from various other objects in an image, and would have to identify the head as a head, regardless of the head's orientation. Such an approach can require shape or contour matching, for example, which can still be relatively processor intensive. A less processor intensive approach can involve separating the head from the background before analysis.

In at least some embodiments, a light emitting diode (LED) or other source of illumination can be triggered to produce illumination over a short period of time in which an image capture element is going to be capturing image information. With a sufficiently fast capture or shutter speed, for example, the LED can illuminate a feature relatively close to the device much more than other elements further away, such that a background portion of the image can be substantially dark (or otherwise, depending on the implementation). In one example, an LED or other source of illumination is activated (e.g., flashed or strobed) during a time of image capture of at least one camera or sensor. If the user's head is relatively close to the device, the head will appear relatively bright in the image. Accordingly, the background images will appear relatively, if not almost entirely, dark. This approach can be particularly beneficial for infrared (IR) imaging in at least some embodiments. Such an image can be much easier to analyze, as the head has been effectively separated out from the background, and thus can be easier to track through the various images. Further, there is a smaller portion of the image to analyze to attempt to determine relevant features for tracking. In embodiments where the detection time is short, there will be relatively little power drained by flashing the LED in at least some embodiments, even though the LED itself might be relatively power hungry per unit time. A further benefit is that the human eye is a retro-reflector and the pupils will show as bright spots in the reflected IR, such that the eyes can also potentially be easily separated from the background in at least some embodiments.

Such an approach can work both in bright or dark conditions. A light sensor can be used in at least some embodiments to determine when illumination is needed due at least in part to lighting concerns. In other embodiments, a device might look at factors such as the amount of time needed to process images under current conditions to determine when to pulse or strobe the LED. In still other embodiments, the device might utilize the pulsed lighting when there is at least a minimum amount of charge remaining on the battery, after which the LED might not fire unless directed by the user or an application, etc. In some embodiments, the amount of power needed to illuminate and capture information using the gesture sensor with a short detection time can be less than the amount of power needed to capture an ambient light image with a rolling shutter camera without illumination.

In some embodiments, a computing device might utilize one or more motion-determining elements, such as an electronic gyroscope, to attempt to assist with location determinations. For example, a rotation of a device can cause a rapid shift in objects represented in an image, which might be faster than a position tracking algorithm can process. By determining movements of the device during image capture, effects of the device movement can be removed to provide more accurate three-dimensional position information for the tracked user features.

Figure 8:
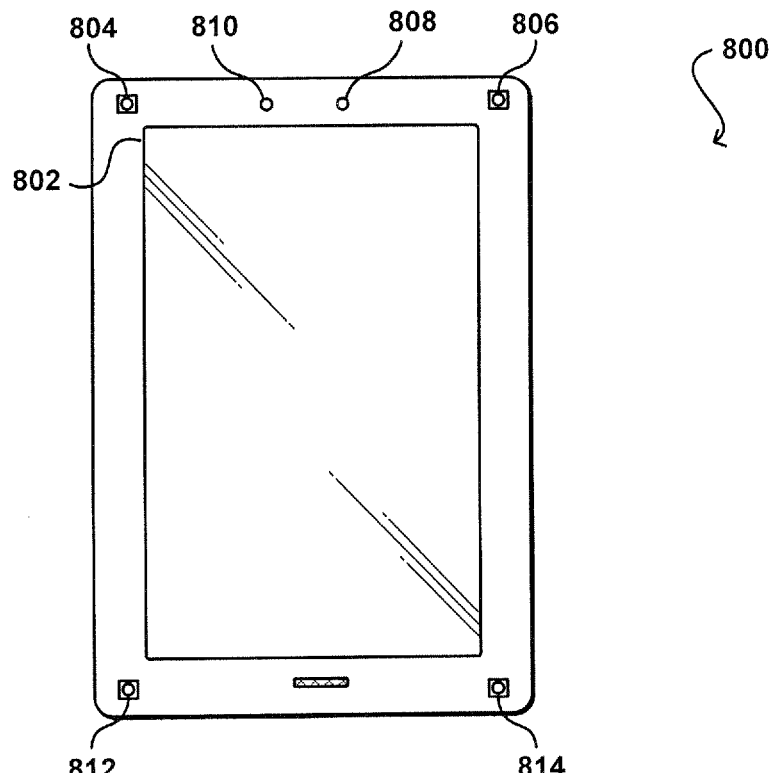
FIG. 8 illustrates an example computing device that can be used in accordance with various embodiments.

FIG. 8 illustrates an example computing device 800 that can be used to perform methods in accordance with various embodiments discussed and suggested herein. In this example, the device has four image capture elements 804, 806, 812, 814 positioned at various locations on the same side of the device as a display element 802, enabling the device to capture image information about a user of the device during typical operation where the user is at least partially in front of the display element. In this example, each capture element is a camera capable of capturing image information over a visible and/or infrared (IR) spectrum, and in at least some embodiments can select between visible and IR operational modes. It should be understood, however, that there can be fewer or additional elements of similar or alternative types in any appropriate location(s) in other embodiments, and that there can be combinations of cameras, infrared detectors, gesture sensors, and other such elements used with various devices.

In this example, a light sensor 808 is included that can be used to determine an amount of light in a general direction of objects (e.g., user features) to be captured and at least one illumination element 710, such as a white light emitting diode (LED) or infrared (IR) emitter, as discussed elsewhere herein, for providing illumination in a particular range of directions when, for example, there is insufficient ambient light determined by the light sensor or reflected IR radiation is to be captured. The device can have a material and/or components that enable a user to provide "squeeze" input to the device by applying pressure at one or more locations. A device casing can also include touch-sensitive material that enables a user to provide input by sliding a finger or other object along a portion of the casing. Various other elements and combinations of elements can be used as well within the scope of the various embodiments as should be apparent in light of the teachings and suggestions contained herein.

Figure 9:
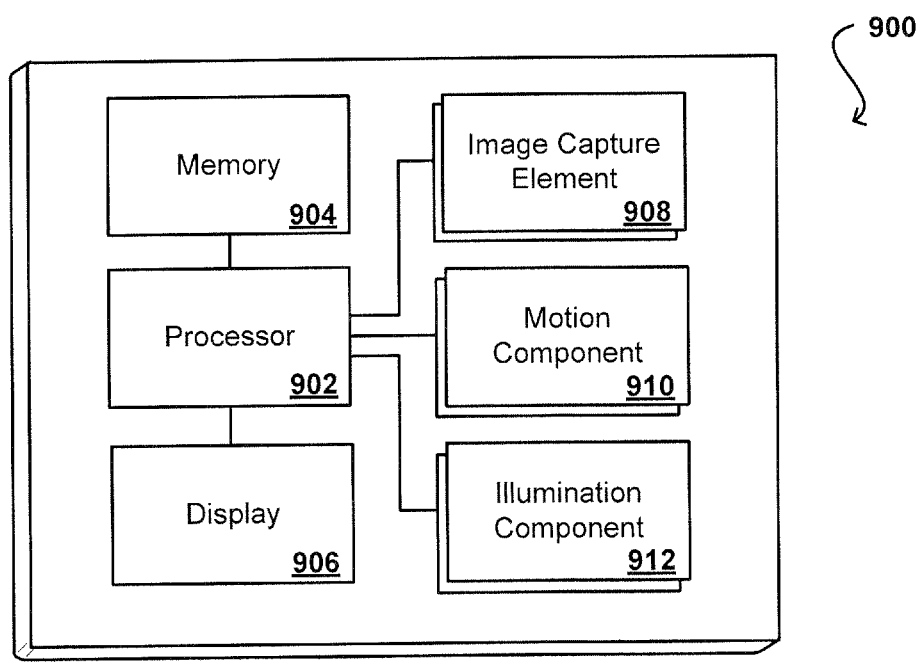
FIG. 9 illustrates an example configuration of components of a computing device such as that illustrated in FIG. 8.

In order to provide various functionality described herein, FIG. 9 illustrates an example set of basic components of a computing device 900, such as the device 800 described with respect to FIG. 8. In this example, the device includes at least one central processor 902 for executing instructions that can be stored in at least one memory device or element 904. As would be apparent to one of ordinary skill in the art, the device can include many types of memory, data storage or non-transitory computer-readable storage media, such as a first data storage for program instructions for execution by the processor 902, the same or separate storage can be used for images or data, a removable storage memory can be available for sharing information with other devices, etc. The device typically will include some type of display element 906, such as a touch screen, electronic ink (e-ink), organic light emitting diode (OLED) or liquid crystal display (LCD), although devices such as portable media players might convey information via other means, such as through audio speakers. In at least some embodiments, the display screen provides for touch or swipe-based input using, for example, capacitive or resistive touch technology.

As discussed, the device in many embodiments will include at least one image capture element 908, such as one or more cameras that are able to image a user, people, or objects in the vicinity of the device. An image capture element can include, or be based at least in part upon any appropriate technology, such as a CCD or CMOS image capture element having a determined resolution, focal range, viewable area, and capture rate. The image capture elements can also include at least one IR sensor or detector operable to capture image information for use in determining gestures or motions of the user. The example device includes at least one motion determining component 910, such as an electronic gyroscope used to determine motion of the device for assistance in input determination. The device also can include at least one illumination element 912, as may include one or more light sources (e.g., white light LEDs, IR emitters, or flashlamps) for providing illumination and/or one or more light sensors or detectors for detecting ambient light or intensity, etc.

The example device can include at least one additional input device able to receive conventional input from a user. This conventional input can include, for example, a push button, touch pad, touch screen, wheel, joystick, keypad, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual (e.g., gesture) and audio (e.g., spoken) commands such that a user can control the device without having to be in contact with the device.

Figure 10:
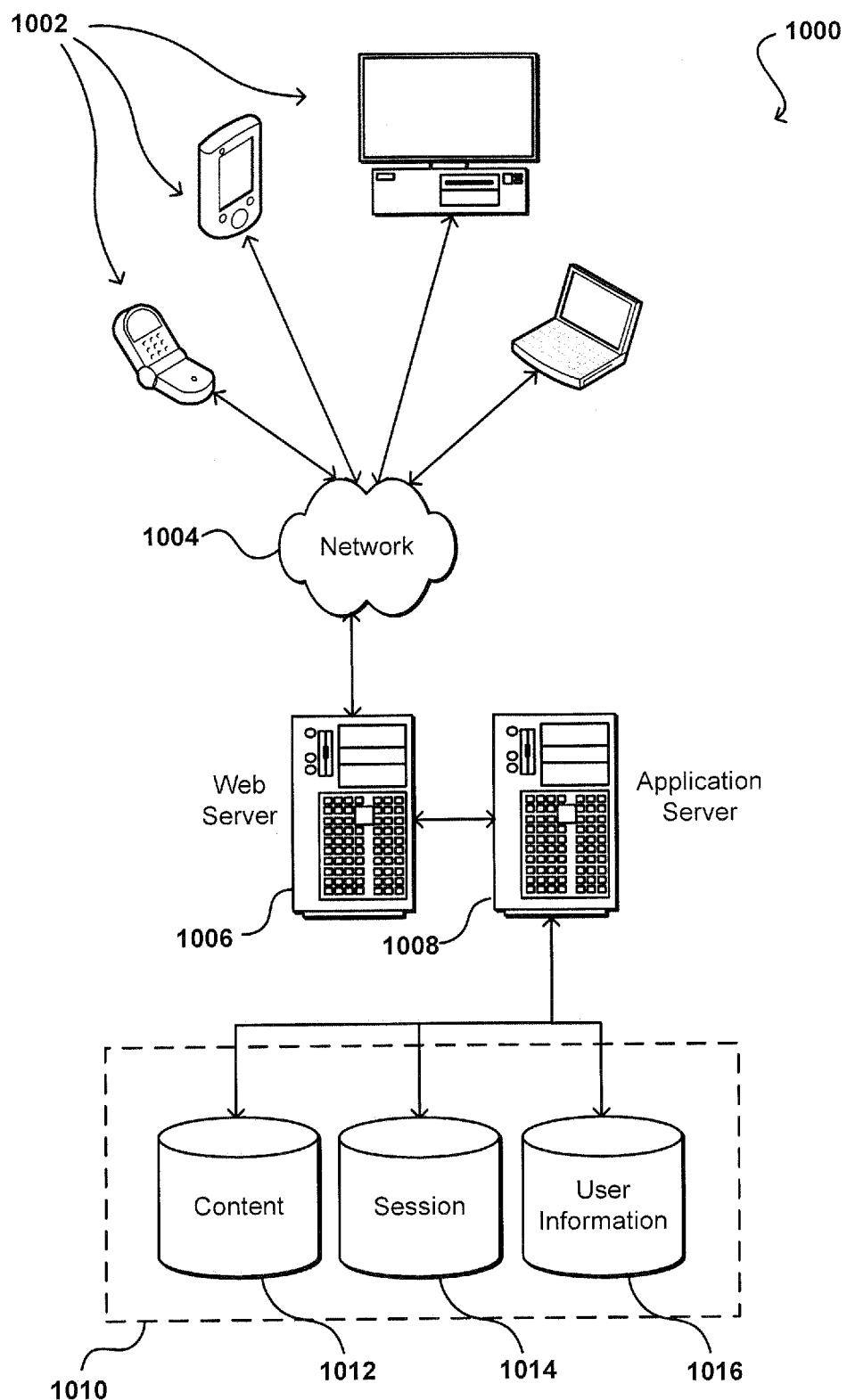
FIG. 10 illustrates an example environment in which various embodiments can be implemented.

As discussed, different approaches can be implemented in various environments in accordance with the described embodiments. For example, FIG. 10 illustrates an example of an environment 1000 for implementing aspects in accordance with various embodiments. As will be appreciated, although a Web-based environment is used for purposes of explanation, different environments may be used, as appropriate, to implement various embodiments. The system includes an electronic client device 1002, which can include any appropriate device operable to send and receive requests, messages or information over an appropriate network 1004 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1006 for receiving requests and serving content in response thereto, although for other networks, an alternative device serving a similar purpose could be used, as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1008 can include any appropriate hardware and software for integrating with the data store 1010 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1006 in the form of HTML, XML or another appropriate structured language in this example. The handling of all requests and responses, as well as the delivery of content between the client device 1002 and the application server 1008, can be handled by the Web server 1006. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing content (e.g., production data) 1012 and user information 1016, which can be used to serve content for the production side. The data store is also shown to include a mechanism for storing log or session data 1014. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keypad, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising: capturing image information using a camera of a computing device;
analyzing the image information, using at least one processor of the computing device, to determine a current viewing angle of a user with respect to a display screen of the computing device;
determining, using the at least one processor, initial rendering information for at least one graphical element to be displayed on the display screen of the computing device, the initial rendering information corresponding to a projection of the at least one graphical element onto an image plane that is based at least in part upon the current viewing angle and provides a three-dimensional appearance of the at least one graphical element; determining, using the at least one processor, a required amount of distortion to be applied to the at least one graphical element, by at least:
determining an apparent shape of the display screen from a perspective of the user using the determined current viewing angle;
determining apparent locations of portions of the at least one graphical element to be displayed according to the apparent shape;
associating pixel location data corresponding to the apparent locations to pixel location data corresponding to positions on the display screen;
generating, using at least one anamorphic projection algorithm, modified rendering information for the at least one graphical element, the modified rendering information being manipulated according to the required amount of distortion to enable an intended shape of the at least one graphical element to be maintained over a range of viewing angles;
and causing the at least one graphical element to be displayed using the modified rendering information.

2. The computer-implemented method of claim 1, further comprising:
associating an apparent pixel location of each corner of the display screen from the perspective of the user to a corresponding pixel location of the display screen.

3. The computer-implemented method of claim 1, wherein the required amount of distortion comprises at least one of skewing, stretching or compressing, and the required amount of distortion is applied to the at least one graphical element in at least one direction based at least in part upon the current viewing angle of the user.

4. The computer-implemented method of claim 1, wherein the number of pixels of the display screen corresponds to a height or width of the display screen.

5. The computer-implemented method of claim 1, wherein determining the required amount of distortion to be applied further comprises:
determining, for the current viewing angle, an apparent height of the at least one graphical element based on a product between a height of the at least one graphical element and a cosine of the current viewing angle of the user.

6. The computer-implemented method of claim 1, further comprising:
interpolating between data points of the at least one graphical element in the modified rendering information.

7. A computer-implemented method, comprising: determining content to be displayed on a display element of a computing device, the content being displayed with a three-dimensional appearance;
determining a current viewing perspective of a user with respect to the display element;
determining initial rendering information for the content, the initial underline rendering information corresponding to a projection of the content onto an image plane that is based at least in part upon the current viewing perspective and provides the three-dimensional appearance of the content;
determining a required amount of distortion to be applied to the content, by at least: determining an apparent shape of the display screen from a perspective of the user using the determined current viewing angle;
determining apparent locations of portions of the at least one graphical element to be displayed according to the apparent shape;
and associating pixel location data corresponding to the apparent locations to pixel location data corresponding to positions on the display screen;
and generating modified rendering information for the content, the content being modified according to the required amount of distortion to maintain an intended shape over a range of viewing perspectives.

8. The computer-implemented method of claim 7, further comprising utilizing a three-dimensional model for the content to determine a view of the content for the current viewing perspective.

9. The computer-implemented method of claim 7, further comprising applying anamorphic projection to the content.

10. The computer-implemented method of claim 9, further comprising at least one of stretching or compressing a shape of the content in at least one direction based at least in part upon the current viewing perspective.

11. The computer-implemented method of claim 10, wherein at least one of an amount or direction of the stretching or compressing is determined at least in part by associating corners of the display element to corners of an apparent shape of the display element as seen from the current viewing perspective.

12. The computer-implemented method of claim 7, further comprising:
tracking changes in the current viewing perspective of the user; and
updating the modified rendering information based at least in part upon the changes in the current viewing perspective.

13. The computer-implemented method of claim 12, wherein the changes are tracked using at least one of captured image information or motion sensor data.

14. The computer-implemented method of claim 13, wherein the motion sensor data includes data from at least one of an accelerometer, an electronic gyroscope, an electronic compass, or an inertial sensor.

15. The computer-implemented method of claim 7, wherein determining the current viewing perspective of the user comprises:
capturing image information to locate at least one feature of the user; and
analyzing the captured image information to determine a position of the at least one feature.

16. The computer-implemented method of claim 15, wherein the feature includes at least one of the user's head, eyes, or facial feature.

17. The computer-implemented method of claim 15, wherein the at least one feature is located in the captured image information using at least one of an image recognition algorithm, a contour matching algorithm, a retro-reflection detecting algorithm, or a color matching algorithm.

18. The computer-implemented method of claim 15, wherein the image information includes at least one of video or a set of digital images.

19. The computer-implemented method of claim 7, further comprising:
   determining an amount of illumination to locate a feature of a user for determining the current viewing perspective; and
   activating an illumination element when a current amount of illumination is less than the determined amount.

20. The computer-implemented method of claim 19, wherein the illumination element produces visible light or infrared radiation.

21. A computing device, comprising: a device processor; a camera;
   a display screen;
   and a memory device including instructions operable to be executed by the processor to perform a set of actions, the instructions when executed enabling the computing device to:
   generate, using the camera, image information representing a user of the computing device;
   determine a current viewing perspective of the user based at least in part upon the image information;
   determine a graphical element to be displayed on the display screen, the graphical element being displayed with a three-dimensional appearance;
   determine initial rendering information for the graphical element, the initial rendering information corresponding to a projection of the graphical element onto an image plane that is based at least in part upon the current viewing perspective and provides the three-dimensional appearance of the graphical element;
   determine a required amount of distortion to be applied to the graphical element, by at least: determine an apparent shape of the display screen from a perspective of the user using the determined current viewing angle;
   determine apparent locations of portions of the at least one graphical element to be displayed according to the apparent shape;
   and associate pixel location data corresponding to the apparent locations to pixel location data corresponding to positions on the display screen;
   and generate modified rendering information for the graphical element based at least in part upon the current viewing perspective, the graphical element being modified through the rendering according to the required amount of distortion to maintain an intended shape over a range of viewing perspectives.

22. The computing device of claim 21, wherein the required amount of distortion comprises at least one of skewing, stretching or compressing, and the required amount of distortion is applied to the graphical element in at least one direction based at least in part upon the current viewing perspective of the user.

23. The computing device of claim 21, wherein the instructions when executed further cause the computing device to:
   associate an apparent location of each corner of the display screen from the current viewing perspective to a respective pixel location of the display screen to determine how to associate pixel location data corresponding to the apparent locations to pixel location data corresponding to positions on the display screen.

24. The computing device of claim 21, wherein the instructions when executed further cause the computing device to:
   interpolate between data points of the at least one graphical element in the modified rendering information.

25. A non-transitory computer-readable storage medium storing instructions that, when executed by at least one processor of a computing device, cause the computing device to:
   determine a current viewing angle of the user with respect to a display element of the computing device;
   determine content to be displayed on the display element, the content being displayed with a three-dimensional appearance;
   determine initial rendering information for the content, the initial rendering information corresponding to a projection of the content onto an image plane that is based at least in part upon the current viewing angle and provides the three-dimensional appearance of the content;
   render the content for display on the display element according to the initial rendering information, including at least:
   determine an orientation with which to render the content for the current viewing perspective;
   determine a required amount of distortion to be applied to the content, by at least:
      determine an apparent shape of the display screen from a perspective of the user using the determined current viewing angle;
      determine apparent locations of portions of the at least one graphical element to be displayed according to the apparent shape;
      and associate pixel location data corresponding to the apparent locations to pixel location data corresponding to positions on the display screen; and
   determine an amount of anamorphic projection to apply to the content according to the required amount of distortion to enable the content to maintain an intended shape over a range of viewing perspectives.

26. The non-transitory computer-readable storage medium of claim 25, wherein to determine the orientation includes using a three-dimensional model for the content for the current viewing perspective to determine an appropriate view of the content, and
   wherein the amount of anamorphic projection includes at least one of an amount or direction of stretching or compressing of a shape of the content based at least in part upon the current viewing perspective.

27. The non-transitory computer-readable storage medium of claim 25, wherein the instructions when executed further cause the computing device to:
   track changes in the current viewing perspective of the user; and
   render the content based at least in part upon changes in the current viewing perspective.

* * * * *